United States Patent [19]

Tamamura et al.

[11] Patent Number: 5,011,265
[45] Date of Patent: Apr. 30, 1991

[54] OPTICAL ATTENUATOR

[75] Inventors: Hisashi Tamamura; Shoji Sekiguchi, both of Tokyo, Japan

[73] Assignee: Sony/Tektronix Corporation, Tokyo, Japan

[21] Appl. No.: 476,833

[22] Filed: Feb. 7, 1990

[30] Foreign Application Priority Data

Oct. 6, 1989 [JP] Japan .................................. 1-261763

[51] Int. Cl.⁵ ........................ B02B 27/14; B02B 27/42
[52] U.S. Cl. .................................... 350/173; 350/171; 350/162.12
[58] Field of Search .............................. 350/171–173, 350/512, 514, 541, 358, 356, 162.12–162.14

[56] References Cited

U.S. PATENT DOCUMENTS 3,869,697  3/1975  Kawasaki ...................... 350/162 SF
4,827,334  5/1989  Johnson et al. ..................... 350/173
4,836,649  6/1989  Ledebuhr et al. ................... 350/173

Primary Examiner—Bruce Y. Arnold
Assistant Examiner—James Phan
Attorney, Agent, or Firm—Dellett, Smith-Hill and Bedell

[57] ABSTRACT

An optical attenuator includes a first beam splitter for receiving an incident light beam from a light source at a predetermined angle of incidence and splitting it into a first reflected light beam and a first transmitted light beam, and a second beam splitter for receiving the first reflected light beam at the same predetermined angle of incidence and splitting it into a second refelected light beam and a second transmitted light beam. The first and second beam splitters are arranged such that the planes of incidence of the first and second beam splitters are perpendicular to each other. The optical attenuator further includes a first deflector for deflecting the first transmitted light beam to cause the deflected light to be propoagated in other than the incident direction of the first transmitted light beam. A second deflector is also provided to deflect the second transmitted light beam to cause the deflected light to be propagated in other than the incident direction of the second transmitted light beam.

6 Claims, 3 Drawing Sheets

OPTICAL ATTENUATOR

FIELD OF INVENTION

The present invention relates to an optical attenuator and in particular to an optical attenuator for producing a precisely attenuated light beam.

BACKGROUND OF THE INVENTION

An optical attenuator is generally utilized to attenuate the intensity of a light beam in a predetermined ratio. For example, an optical attenuator may be used in a measurement or other application to attenuate the intensity of an output light beam from a light source such as a high power semiconductor laser diode. A conventional optical attenuator typically includes one or more ND (Neutral Density) filters. It is possible to provide such an optical attenuator with a desired transmittance (the reciprocal of the attenuation ratio) by selectively combining a plurality of ND filters each having a predetermined transmittance.

The attenuation function of an ND filter in such an optical attenuator is obtained by reflecting an incident light beam from a light source with a predetermined reflectance. However, light returned from the optical attenuator to the light source causes unstable operation of the laser diode in the light source due to the optical feedback effect.

It is conventional to slightly incline such ND filters with respect to the incident light beam to prevent the reflected light from returning to the light source. In order to ensure that reflected light is not returned to the light source, the filters must be spaced from the light source by a distance that depends on the width of the light beam. Since a typical semiconductor laser diode emits a divergent light beam, the output laser beam inevitably has a rather large diameter even if the beam is collimated by a collimator lens. Therefore, it is difficult to make an optical attenuator that is small in size.

If the angle at which the filters are inclined to the optical axis is large, it may be possible to prevent reflected light from returning to the light source without placing the filters far away from the light source. If the angle of the filters is too large, however, the polarization effect of the filter is changed. Thus, the transmittance of the filters is changed in response to the polarized direction of the incident light beam as described hereinafter. According to the theory of optics, when linearly polarized light is incident on a medium such as glass at a particular angle of incidence Th, the transmittance T of the medium is:

$$T = TP^* \cos^2 A + TS^* \sin^2 A \qquad (1)$$

where A is an azimuthal angle which is defined as the angle between the electric field vector of the incident light beam and the plane of incidence. The plane of incidence is defined as the plane including both the axis of the incident light beam and the normal to the surface of the medium at the point of incidence. TP is the transmittance of the component parallel to the plane of incidence and TS is the transmittance of the component perpendicular to the plane of incidence. The symbol * represents the multiplication operation.

Since the values of TP and TS are dependent on the angle of incidence Th, the values of TP and TS differ increasingly from each other as the angle of incidence Th increases. When the light source revolves around the optical axis, and therefore the azimuthal angle changes, the transmittance T is changed so that the intensity of the transmitted light is changed. Thus, since it is undesirable to considerably incline the filters with respect to the incident beam, it is conventional to provide a unidirectional apparatus such as an optical isolator between the light source and the filters to prevent reflected light from returning to the light source. This is a significant problem causing complexity and inaccuracy of a conventional optical attenuator.

SUMMARY OF THE INVENTION

In accordance with one preferred embodiment of the present invention, an optical attenuator includes a beam splitter for receiving an incident light beam from a light source at a predetermined angle of incidence to split it into a first reflected light beam and a first transmitted light beam, and a second beam splitter for receiving the first reflected light beam at the same predetermined angle of incidence to split it into a second reflected light beam and a second transmitted light beam. The first and second beam splitters have the same optical characteristics and are arranged so that their planes of incidence are perpendicular to each other. The optical attenuator further includes a first deflecting means for deflecting the first transmitted light beam from the first beam splitter to cause the deflected light to be propagated in other than the incident direction of the first transmitted light beam, and a second deflecting means to deflect the second transmitted light beam from the second beam splitter to cause the deflected light to be propagated in other than the incident direction of the second transmitted light beam.

The incident light beam is partly reflected by the first and second beam splitters and the transmitted light beams through the beam splitters are deflected in other than the respective incident directions by the first and second deflecting means. Therefore, no light is returned to the light source and perturbation in the operation of the light source is eliminated. The distance between the light source and the optical attenuator can be further reduced in comparison with a conventional system in order to more miniaturize such an optical system. Since the two planes of incidence associated with the beam splitters, respectively, are perpendicular to each other, the azimuthal angle of the incident light from the light source does not affect the transmittance of the optical attenuator.

DETAILED DESCRIPTION

Figure 1:
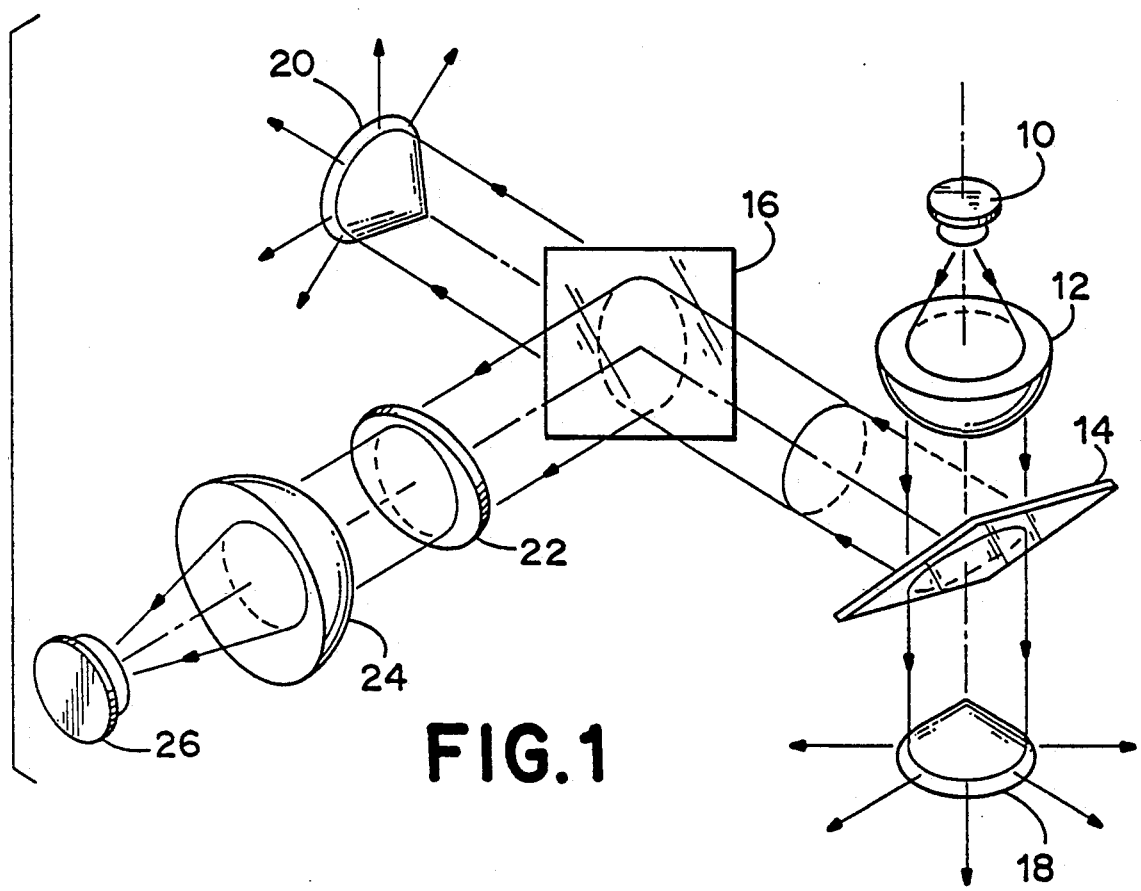
FIG. 1 is a schematic perspective view representing the basic construction of one embodiment of the present invention.

Referring to FIG. 1, incident light from a light source 10 such as a semiconductor laser diode is collimated by a collimator lens 12. The optical attenuation system in FIG. 1 basically includes first and second beam splitters 14 and 16. The first and second beam splitters 14 and 16 should have the same optical characteristics. The parallel light beam is incident on the first beam splitter 14 at a predetermined angle of incidence Th, for example 45 degrees. The reflected light beam from the first beam splitter 14 is incident on the second beam splitter 16 at the same angle of incidence Th. The light transmitted through the first beam splitter 14 is scattered by a first deflector 18 in other than the direction of the incident light beam to completely prevent any transmitted light from returning to the light source 10. Similarly, the light transmitted through the second beam splitter 16 is also deflected or scattered by a second deflector 20 in other than the direction of the incident light beam from the first beam splitter 14 to prevent any light from returning to the light source 10. An ND filter 22 may be provided to further attenuate the reflected light from the second beam splitter 16 if necessary. It may be desired to employ a movable filter as the filter 22 to adjust the transmittance of the optical attenuator by removing the filter 22 from the light path or by replacing the filter 22 with another one. The light beam transmitted through the filter 22 is concentrated by a condenser lens 24 and applied to an optical detector 26. The optical detector 26 converts the light beam from the filter 22 to an electric signal.

Figure 2:
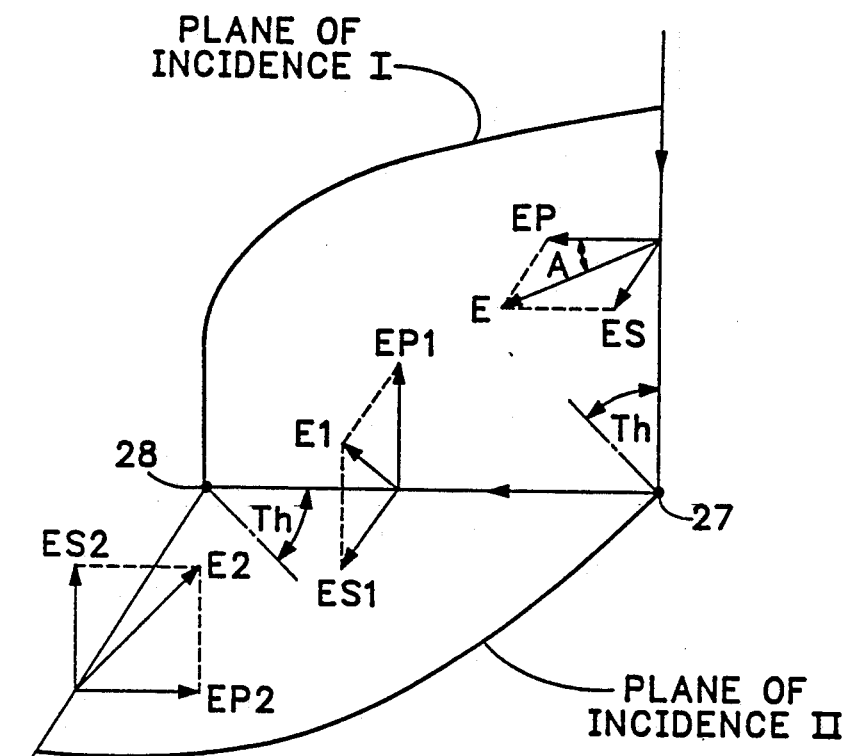
FIG. 2 is a schematic diagram representing the behavior of light being propagated through the optical attenuator in FIG. 1.

FIG. 2 illustrates in simplified fashion the reflected light path through the optical attenuator of FIG. 1. The operation of reflection by the first and second beam splitters 14 and 16 is described in detail hereinafter. As shown in FIGS. 1 and 2, the first and second beam splitters 14 and 16 are arranged such that the plane of incidence I associated with the beam splitter 14 is perpendicular to the plane of incidence II associated with the beam splitter 16. For the reason to be described hereinafter, the first and second beam splitters 14 and 16 have the same angle of incidence Th. The common angle of incidence Th for both beam splitters 14 and 16 is set at 45 degrees, but it can be set at another value if desired. As is shown in FIG. 2, the incident light beam is reflected at the incident point 27 by the first beam splitter 14 and then reflected at the point 28 by the second beam splitter 16. In FIG. 2, the first and second beam splitters and the light beams transmitted therethrough are not shown for convenience of explanation.

Assume that the incident light beam applied to the optical attenuator is a linearly polarized light beam such as the output light beam from a laser diode. The electric field vector E of the incident light can be resolved into two components $EP = E*\cos A$ and $ES = E*\sin A$ which are, respectively, parallel and perpendicular to the plane of incidence I, where A is the azimuthal angle between the electric field vector E and the plane of incidence I. The propagation energy of the incident light beam per unit time and per unit area is typically represented by its intensity L, which is a scalar quantity proportional to the square of the electric field vector E of the incident light beam. The intensity L of the incident light beam may further be represented by the expression $L = LP + LS$, where LP and LS are intensity components proportional to the squares of the electric field vector components EP and ES respectively. The electric field vectors of the first and second reflected light beams from the first and second beam splitters 14 and 16 of FIG. 1 are respectively represented by E1 and E2 in FIG. 2. EP1 and ES1 are the parallel and perpendicular electric field vector components, respectively, of E1 and, similarly, EP2 and ES2 are the parallel and perpendicular electric field vector components, respectively, of E2. The propagation energy values per unit time and per unit area (i.e. intensities) of the first and second reflected light beams may be represented by the formulas $L1 = LP1 + LS1$, and $L2 = LP2 + LS2$, respectively, where LP1 and LP2 are proportional to the squares of the electric field vector components EP1 and EP2, respectively, and LS1 and LS2 are proportional to squares of the electric field vector components ES1 and ES2, respectively. The reflectances R1 and R2 of the first and second beam splitters are defined as $R1 = L1/L$ and $R2 = L2/L1$, respectively. When the reflectances of the components parallel and perpendicular to the plane of incidence I are represented by RP1 and RS1, the following expressions can be derived from the theory of optics:

$$R1 = RP1*\cos^2 A + RS1*\sin^2 A \qquad (2)$$

where RP1+LP1/LP and RS1+LS1/LS. RP1 and RS1 depend on the angle of incidence Th of the incident light beam. As is shown in FIGS. 1 and 2, the first and second beam splitters are arranged to set the respective angles of incidence at the same value Th and, therefore, the parallel and perpendicular reflectances of the plane of incidence I are equal to those of the plane of incidence II, namely, $RP1 = RP2 = RP$ and $RS1 = RS2 = Rs$.

Figure 3:
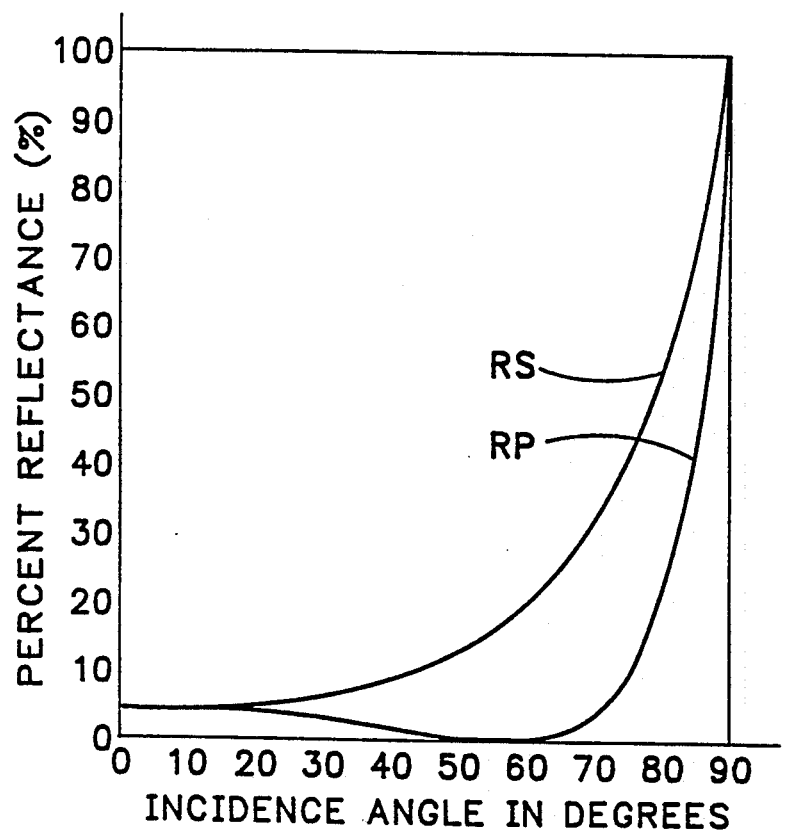
FIG. 3 is a graph of reflectance components parallel and perpendicular to a plane of incidence as a function of the angle at which external light is incident on a crown glass surface.

FIG. 3 shows the behavior of reflectance components RP and RS associated with light components parallel and perpendicular to a plane of incidence as a function of the angle at which external light is incident on a crown glass surface. Referring to FIG. 3, it should be noted that at the angle of incidence of 45 degrees the value of RP is different from that of RS and, therefore, the reflectance R1 of the formula (2) varies in response to the change of the azimuthal angle A. In accordance with the present invention, in order to compensate for the influence of the change of azimuthal angle A the first and second beam splitters are disposed such that the planes of incidence I and II are perpendicular to each other and the two angles of incidence are equal. $LP1 = LP*RP$ and $LS1 = LS*RS$ can be derived from the formula (2) and the above description. However, since the plane of incidence II of the second beam splitter is perpendicular to the plane of incidence I of the first beam splitter, the following relations can be provided:

$$LP2 = LS1*RP = LS*RS*RP \text{ and}$$

$$LS2 = LP1*RS = LP*RP*RS \qquad (3)$$

Thus, $$L2 = LP2 + LS2 = (LP + LS)*RP*RS = L*RP*RS \qquad (4)$$

As is apparent from the formula (4), the intensity L2 of the output light beam from the second beam splitter 16 is independent of the azimuthal angle A representing the direction of the electric field vector of the incident light beam because RP and RS are only dependent on the angle of incidence Th. It is further apparent that the following relation can be derived from the above description:

$$R1*R2 = RP*RS \qquad (5)$$

Thus, the total transmittance T of the optical attenuator in FIGS. 1 and 2 can be represented by the following formula:

$$T = L2/L = RP*RS \quad (6)$$

As is apparent from the formula (6) the total transmittance T of the optical attenuator is represented by the simple product of the reflectance components RP and RS and is completely independent of the azimuthal angle A of the incident light beam from the light source. It is, therefore, possible to provide an optical attenuator having accurate and stable attenuation performance which is not affected by the polarization of the incident light beam.

Figure 4:
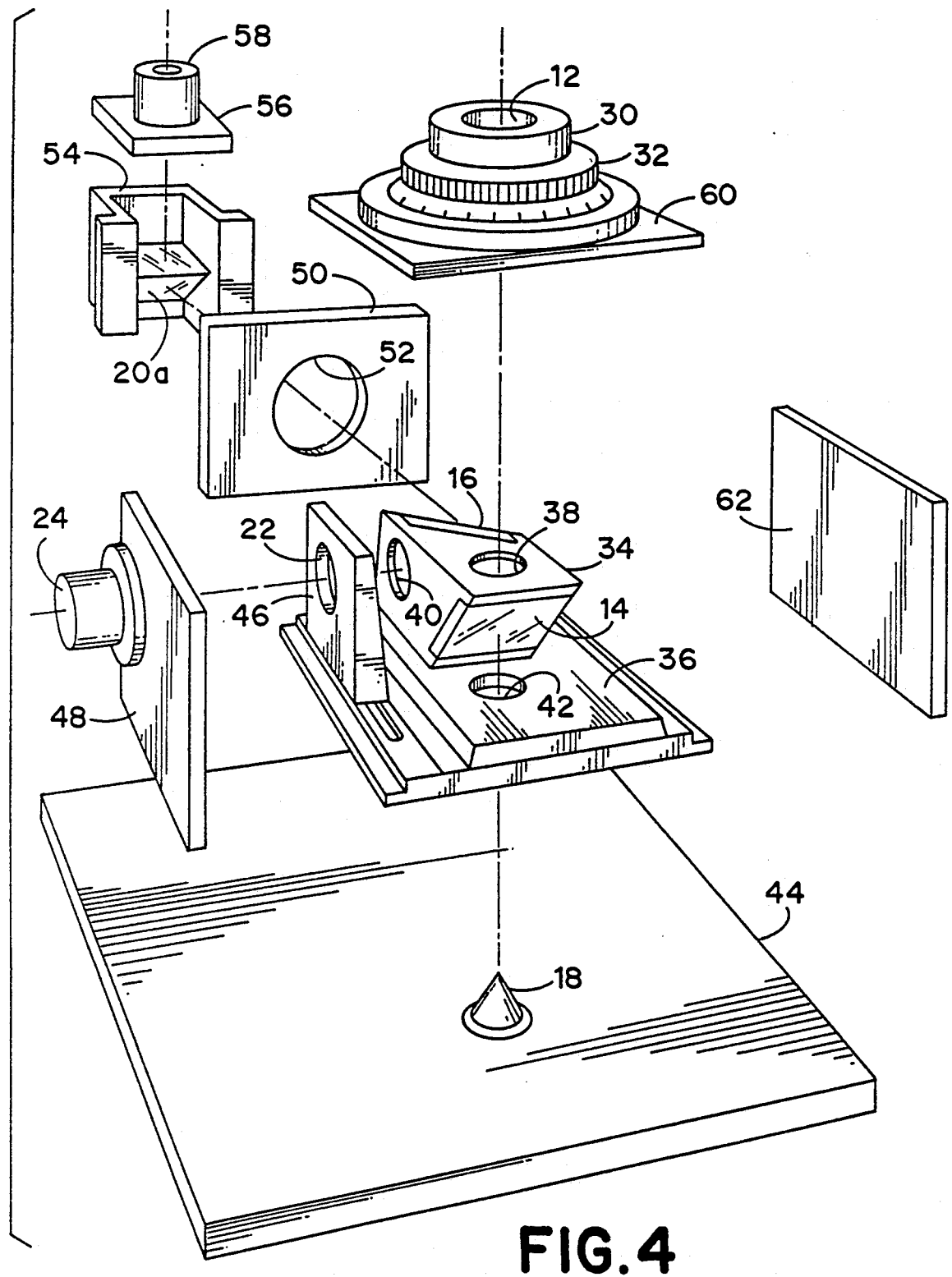
FIG. 4 is a schematic exploded perspective view of another embodiment of the present invention.

FIG. 4 shows an exploded perspective view of another embodiment of the present invention. The corresponding components in FIG. 4 have the same reference numbers as those in FIG. 1. The collimator lens 12 is mounted in a lens holder 30 provided with a dial 32 for fine adjustment of the position of the collimator lens 12 along the optical axis to produce a completely collimated incident light beam. As described hereinbefore, the incident light beam is split by the first beam splitter 14 into a first reflected light beam and a first transmitted light beam. The first reflected light beam from the first beam splitter 14 is split by the second beam splitter 16 into the second reflected light beam and the second transmitted light beam. The first and second beam splitters 14 and 16 are fixed by a supporting member 34 preferably made of metal, for example aluminum, so that the angles of incidence on the beam splitters are each set at 45 degrees and the planes of incidence associated with the two beam splitters are perpendicular to each other. The beam splitters may be made of crown glass that has been coated to achieve higher reflectances for an angle of incidence of 45 degrees than those shown in FIG. 3. The supporting member 34 is fixed to a bottom structure 36 preferably made of metal. The incident light beam from the collimator lens 12 is incident on the first beam splitter 14 by way of the entrance aperture 38 on the top of the supporting member 34. The second reflected light beam from the second beam splitter 16 is emitted by way of the exit aperture 40 provided on the side of the supporting member 34.

The first transmitted light beam from the first beam splitter 14 is transmitted to the first deflector 18 by way of the aperture 42 provided on the bottom structure 36. The first deflector 18 is attached to the bottom external structure 44 and is a cone shaped reflector to reflect light from the first beam splitter 14 in directions other than the incidence direction thereof in order to prevent the reflected light from returning to the light source (not shown). Preferably, the surface of the first deflector 18 is coated with light absorbing material.

The ND filter 22 may be provided to further attenuate the second reflected light beam emitted through the exit aperture 40 from the second beam splitter 16. The sliding lens holder 46 for holding the filter 22 is disposed so that the filter 22 is slightly inclined to the optical axis so that the angle of incidence at the filter 22 is approximately 5 degrees and therefore the light reflected from the filter 22 is prevented from returning back to the light source. If the attenuation of the filter 22 is unnecessary, it is possible to slide the lens holder 46 to remove the filter 22 from the light path. The second reflected light beam from the second beam splitter 16 is concentrated by the condenser lens 24 provided on the side structure 48 and is applied to an optical detector such as a PIN photodiode (not shown).

The second transmitted light beam which is transmitted through the second beam splitter 16 is propagated by way of the aperture 52 of the side structure 50 to the second deflector 20a, which is attached to the supporting structure 54. The second deflector 20a in FIG. 4 has a trigonal shape as opposed to the cone shape of the second deflector 20 in FIG. 1. The trigonal deflector 20a divides the second transmitted light beam from the second beam splitter 16 into two beams, which are deflected vertically upward and vertically downward, respectively. The light beam reflected upward by the second deflector 20a is supplied to the monitoring connector 58 provided on the supporting plate 56. The monitoring connector 58 may be used for connecting to an optical fiber cable (not shown) to transmit the light received from the second deflector 20a to an external measurement instrument such as a spectrum analyzer (not shown). In this manner, the optical deflector may be utilized not only for preventing reflected light from returning to the light source, but also for producing a monitoring light beam which is suitable for additional measurement such as spectrum analysis. The optical deflectors 18 and 20 are not limited to the reflecting types that have been described.

As is shown in FIG. 4, the first and second beam splitters 14 and 16 and the ND filter 22 are entirely enclosed with the structures including the bottom structure 36, the upper structure 60 having the collimator lens 12 thereon, the side structures 48, 50 and 62, the front side structure (not shown for convenience), and the supporting structure 54 for supporting the second deflector 20a. The optical attenuator in FIG. 4 is further enclosed with the external structures including the bottom external structure 44 and other external structures (not shown for convenience) to form a compact box type apparatus. It is preferable to entirely coat the inner surfaces of all the parts forming the optical attenuator with light absorbing material in order to reduce random scattering of light.

Proper optical parts for the first and second beam splitters and the filters of the preferred embodiments are available from suppliers such as Melles Griot and Newport Corp. The first and second beam splitters 14 and 16 typically have the following specifications:

Substrate Material: Optical Crown Glass BK 7
Range of wavelength: 600–1000 nm
Reflectance: RP=23 plus or minus 6%, RS=47 plus or minus 6% (at an angle of incidence of 45 degrees)

The ND filter 22 preferably has the transmittance T of 10 plus or minus 5%, and in particular of 10 plus or minus 0.5% (in the range of 750–850 nm). It is apparent that the above specification may be changed in accordance with some real applications.

It will be appreciated that the invention is not restricted to the particular embodiments that have been described, and that variations may be made therein without departing from the scope of the invention as defined in the appended claims and equivalents thereof.

What is claimed is:

1. An optical attenuator comprising:
    a first beam splitter for receiving an incident light beam from a light source at a predetermined angle of incidence to split the beam into a first reflected light beam and a first transmitted light beam;
    a first deflecting means for deflecting the first transmitted light beam from said first beam splitter to cause the deflected light to be propagated in other than the incident direction of the first transmitted light beam;

a second beam splitter for receiving the first reflected light beam at said predetermined angle of incidence and in a plane of incidence perpendicular to the plane of incidence in which the first beam splitter receives the incident light, beam to split the first reflected light beam into a second reflected light beam and a second transmitted light beam; and a second deflecting means for deflecting the second transmitted light beam from the second beam splitter to cause the deflected light to be propagated in other than the incident direction of the second transmitted light beam.

2. An optical attenuator according to claim 1, wherein at least one of said first and second deflecting means includes a reflector for reflecting at least a portion of the light beam received thereby in a predetermined direction for application to a monitoring means.

3. An optical attenuator according to claim 1, wherein each of said first and second deflecting means is a cone shaped reflector for reflecting a light beam received thereby in directions other than the direction of incidence of the received light beam.

4. An optical attenuator according to claim 3, wherein the surface of each of said first and second deflecting means is coated with light absorbing material.

5. An optical attenuator according to claim 1, further comprising an attenuation filter for additionally attenuating the second reflected light beam in a predetermined ratio.

6. An optical attenuator according to claim 5, wherein said attenuation filter is removable from the path of the second reflected light beam.

* * * * *

UNITED STATES PATENT AND TRADEMARK OFFICE
CERTIFICATE OF CORRECTION

PATENT NO. : 5,011,265

DATED : April 30, 1991

INVENTOR(S) : Hisashi Tamamura; Shoji Sekiguchi

It is certified that error appears in the above-identified patent and that said Letters Patent is hereby corrected as shown below:

Column 1, line 51, delete the comma (,) before "the".

Column 4, line 21, delete the plus (+) sign (both occurrences) and substitute an equals (=) sign.

Column 6, line 51, "The ND filter 2?...." should not begin a new paragraph, but should be a part of the previous paragraph.

Column 7, line 8, delete the comma (,) after "light".

Signed and Sealed this

Thirteenth Day of October, 1992

Attest:

DOUGLAS B. COMER

Attesting Officer

Acting Commissioner of Patents and Trademarks